July 30, 1935.  E. H. PERCY  2,009,945

STAVE BENDING AND BEVELING MACHINE

Filed Sept. 12, 1934  2 Sheets-Sheet 1

INVENTOR.
Edwin H. Percy.
BY Townsend & Loftus.
ATTORNEYS.

July 30, 1935.  E. H. PERCY  2,009,945

STAVE BENDING AND BEVELING MACHINE

Filed Sept. 12, 1934  2 Sheets-Sheet 2

INVENTOR.
Edwin H. Percy.
BY Townsend & Loftus.
ATTORNEYS.

Patented July 30, 1935

2,009,945

UNITED STATES PATENT OFFICE 2,009,945

STAVE BENDING AND BEVELING MACHINE

Edwin H. Percy, Fort Bragg, Calif.

Application September 12, 1934, Serial No. 743,631

1 Claim. (Cl. 147—25)

This invention relates to the manufacture of wood tank staves and particularly to a machine for bending the staves and beveling the edges thereof.

The object of the present invention is to generally improve and simplify the construction and operation of machines of the character described and particularly to provide a machine in which wood staves, such as used in the manufacture of tanks, barrels and the like, may be bent to proper shape and both edges of the stave beveled in one operation.

A machine for bending the staves and beveling the edges thereof is shown by way of illustration in the accompanying drawings, in which:

Figs. 4, 5, 6 and 7 are side elevations of different forms used to support and bend the staves prior to beveling the same.

Figure 1:
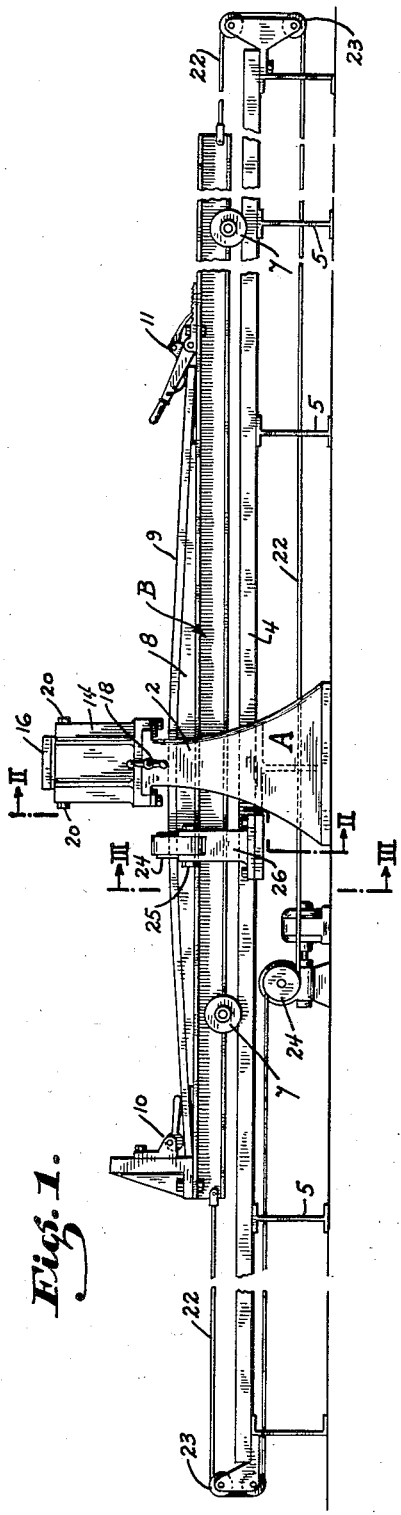
Fig. 1 is a side elevation of the machine.
Figure 2:
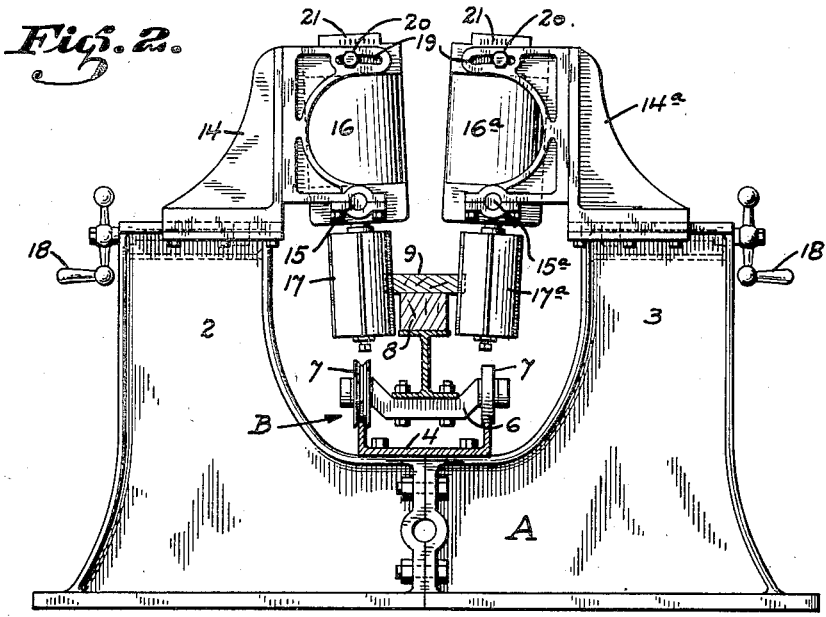
Fig. 2 is an enlarged cross-section taken on line II—II of Fig. 1.
Figure 3:
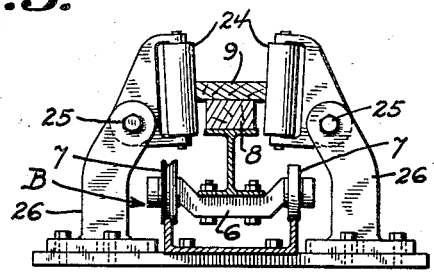
Fig. 3 is an enlarged cross-section taken on line III—III of Fig. 1.

Referring to the drawings in detail and particularly Figs. 1, 2 and 3, A indicates a main frame which is shaped (see Fig. 2) to form a pair of spaced pedestals 2 and 3. Extending through the frame and positioned centrally of the pedestals is a channel-shaped track member 4, which is of considerable length. The track member is supported midway of its length by the frame A and the ends are supported by I-beams or the like such as indicated at 5. Supported by the track and adapted to travel lengthwise thereon is a carriage generally indicated at B, which functions as a support for the wood staves to be bent and beveled. The carriage may be constructed in any suitable manner but as here illustrated consisting of an I-beam supported by a pair of axles 6—6 on which are journaled wheels 7—7 to support and guide the beam on the track. Adapted to be supported on the upper surface of the beam or carriage is a form 8 and adapted to be placed on top thereof and to be bent over the form is a wood stave 9. Disposed at opposite ends of the carriage are clamping devices of suitable construction, one clamp being indicated at 10 and the other at 11. The clamps engage the opposite ends of the stave 9 and thus bend and secure the stave with relation to the form 8.

Supported by the pedestal indicated 2 is a head member 14 and pivotally supported as at 15 on said head is an electric motor 16 which carries a cutter head 17. The pedestal 3 also supports a head member indicated at 14a in which is pivoted as at 15a a motor 16a and a cutter head 17a. The head members are mounted on slides on top of the pedestals 2 and 3 and each head is provided with a worm and screw adjustment actuated by hand cranks 18 at opposite ends whereby the heads, the motors and the cutter heads may be moved to or away from each other so as to increase or decrease the spacing between the cutter heads so as to take care of staves of varying width. The upper portions of the heads are provided with arcuate slots 19. Clamping screws 20 secured to the respective motors and extending through the slots are provided and it is thus possible to swing the motors and the cutter heads about their pivots 15 and 15a to adjust the angular position of the cutter heads, the angle assumed being indicated by a pointer and a cooperating graduated scale such as shown at 21.

When the stave has been clamped in position on the carriage, movement must be transmitted to move the carriage from end to end between the cutter heads so that both edges of the stave may be cut and beveled. Any suitable means may be provided for imparting such longitudinal movement but as here illustrated a cable 22 may be attached to opposite ends. This cable passes over guide sheaves 23 and is actuated by a motor driven drum 24. By rotating the drum in one direction, the carriage is moved longitudinally of the track and by reversing the rotation of the drum, the direction of travel of the carriage is reversed. It is thus possible to feed the carriage with the stave secured thereto between the cutter heads 17 and 17a in either direction.

In actual operation, it must be assumed that the operator knows by the size of the lumber from which the staves are to be made how many staves will be required to constitute a tank. He determines this by dividing the circumference of the tank at its greatest diameter by the width of the finished stave at its greatest width. Suppose it requires ninety staves, then ninety staves represent the full circle of 360° or 4° included angle between the beveled edges of each stave. The motors 16 and 16a together with the cutter heads operated thereby will then be tilted about their pivots to assume a 2° angle as indicated by the scale 21 and will there be set and secured. After this, it is only necessary to close the circuits through the respective motors 16 and 16a and to impart longitudinal movement to the carriage. As it passes along the track, the edges of the stave will be engaged by the cutter heads and both edges will be simultaneously cut and beveled, whereafter the stave may be removed and the next one bent and clamped in position.

By referring to Figs. 1 and 3, it will be noted that a pair of guide rollers, such as shown at 24, are pivotally supported as at 25 to the upper ends of arms 26 forming a part or an extension of the frame A. The guide rollers are set to the same angle as the cutter heads and as the stave, during cutting operation, passes between the cutter heads, the bevel edges will be engaged by the guide rollers 24 and the stave will thus be firmly held and guided during the cutting operation.

The machine here illustrated is intended for the manufacture of wood staves such as employed in the construction of water tanks, wine or liquor tanks, beer tanks, brine tanks, oil tanks, chemical tanks, etc. Such tanks vary in size and shape and the problem of cutting the staves accurately, quickly and to insure correct shape has always been a slow and difficult process, requiring great skill, ingenuity and experience on the part of the operator. The machine constructed as here shown will bend and bevel staves of practically any width and length and for any diameter of tank and comparatively little, if any, skill is required on the part of the operator. The types of tanks most commonly required are:

1. *Parallel or straight side.*—This is a tank with straight sides with uniform diameter the full length.

2. *Straight taper.*—This is a tank that tapers from the bottom to a smaller diameter at the top and has straight sides.

3. *Bilge taper.*—This is strictly a wine tank with the bottom larger in diameter than the top and with curved sides.

4. *Full bilge.*—This tank has the same diameter ends and a large diameter in the center with curved sides. It is a barrel shaped tank.

For a straight taper tank, the form such as shown in Fig. 4 is required. For a taper bilge tank, the form such as shown in Fig. 5 is required. For a full bilge tank or barrel shape, the form such as shown in Figs. 1 and 6 is required. For a half bilge tank, the form will assume the shape shown in Fig. 7 and if the sides of the tank are straight, both sides of the form will be straight.

The machine is not limited to the manufacture of tanks alone as it obviously may be employed for the manufacture of staves such as used in the construction of wooden pipe lines and the like.

The securing of the stave and bending of it on the form is a simple operation as it is quickly accomplished by the use of the clamps 10 and 11.

When the staves are cut or beveled by the cutter heads here shown, the varying width of the stave to conform to the desired shape of the tank is automatically determined by the tilted cutter heads as the raised part of the stave supported by the form is cut higher up on the cutter heads where they are further apart, thus giving the stave a greater width at this point and at the same time maintaining the correct bevel and giving the tank an increased diameter or bilge at this point. All points of the stave machined or cut in this manner will have a mechanically correct bevel and width to form the desired shaped tank, providing, of course, that the proper shaped wood form is placed under the stave when it is secured in the carriage. All staves will be of uniform bevel and width as both edges of the stave are cut or machined at one operation between cutter heads which are rigidly mounted and clamped in a stationary position. The work of bending and beveling the edges is rapidly accomplished and the operation is simple and practical.

While certain features of the present invention are more or less specifically described, I wish it understood that various changes may be resorted to within the scope of the appended claim. Similarly, that the materials and finish of the several parts employed may be such as the manufacturer may decide, or varying conditions or uses may demand.

Having thus described my invention, what I claim and desire to secure by Letters Patent is:

In a machine of the character described, a main frame having a pair of pedestals formed thereon, a track member disposed between the pedestals and below the upper ends of the same and positioned at right angles to the pedestals, a cage movable longitudinally on the track member, means on the cage for receiving and securing a stave, a head member on each pedestal, an electric motor mounted on each head member, a cutter head on each motor and driven thereby, said cutter heads being engageable with the opposite side edges of the stave to bevel the same, means for moving the head members, together with the motors and cutter heads, to and away from each other on the pedestals to take care of staves of varying width, and adjustable means on each head member for tilting and securing the motors and cutter heads to vary the angle of the beveled edges cut on the opposite sides of the stave.

EDWIN H. PERCY.